United States Patent [19]

Alt et al.

[11] 4,228,679
[45] Oct. 21, 1980

[54] APPARATUS FOR MEASURING PARAMETERS OF WORK DIAGRAM OF PISTON MACHINES

[76] Inventors: Viktor V. Alt, 3, kv. 13; Alexandr A. Mischenkov, 3, kv. 24; Viktor A. Ponomarev, 6, kv. 192, all of rabochy poselok Krasnoobsk Novosibirskoi oblasti; Eduard L. Avdjushev, ulitsa Petukhova, 80, kv. 12, Novosibirsk; Jury S. Kamynin, 7, kv. 65; Vladimir P. Baryshnikov, 3, kv. 123, both of rabochy poselok Krasnoobsk Novosibirskoi oblasti; Grigory K. Levin, ulitsa Podvoiskogo, 14, korpus 1, kv. 852; Alexei A. Orlov, ulitsa 3 Internatsionala, 55, kv. 50, both of Leningrad, all of U.S.S.R.

[21] Appl. No.: 28,899

[22] Filed: Apr. 10, 1979

[51] Int. Cl.³ .......................................... G01M 15/00
[52] U.S. Cl. .................................................. 73/117.3
[58] Field of Search ...................... 73/117.3, 116, 118, 73/117.2, 115

[56] References Cited

U.S. PATENT DOCUMENTS

| 4,104,907 | 8/1978 | Tsipouras | 73/117.3 |
| 4,128,005 | 12/1978 | Arnston et al. | 73/117.3 |

*Primary Examiner*—Jerry W. Myracle
*Attorney, Agent, or Firm*—Steinberg & Blake

[57] ABSTRACT

An apparatus for measuring parameters of work diagram of piston machines comprises, connected to one another, a current crankshaft rotation angle counter having inputs coupled, via a crankshaft angular position pulse former and a top dead center pulse former, to an angular mark sensor, and a decoder decoding top dead center signals. To the latter is coupled an input of a flip-flop of an analysis and control unit which also has a counter having an input coupled, via a main coincidence gate, to one of n pressure sensors in cylinders of piston machines, in accordance with the cylinder selected for indication, and a logical circuit having an input coupled to a reversible counter connected to a flip-flop. The apparatus also comprises a series circuit including a decoder for decoding bottom dead center signals coupled to the reversible counter and flip-flop, a cycle length counter and a main flip-flop coupled to the bottom dead center decoder and to an AND gate.

8 Claims, 4 Drawing Figures

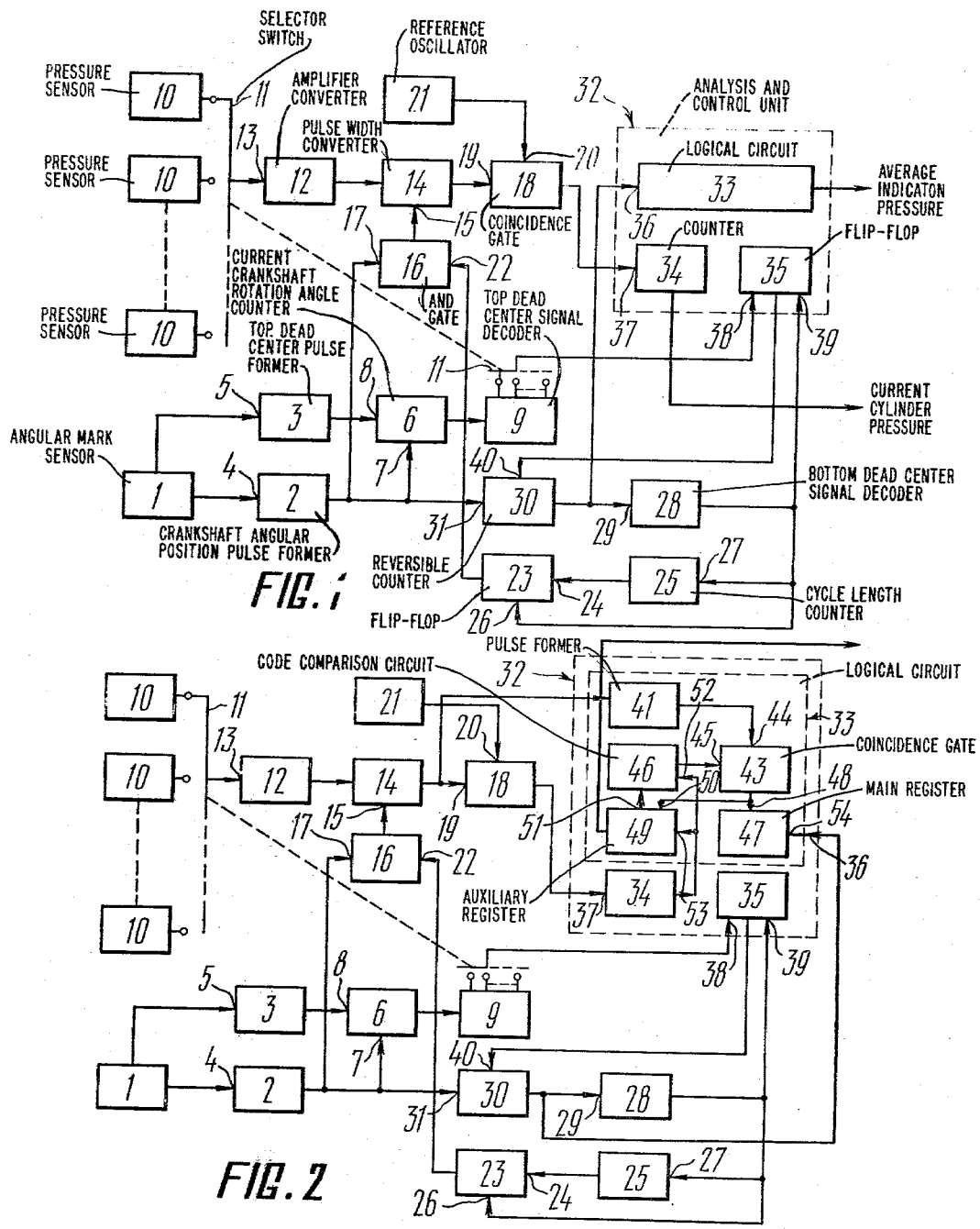

APPARATUS FOR MEASURING PARAMETERS OF WORK DIAGRAM OF PISTON MACHINES

FIELD OF THE ART

The invention relates to the instrumentation, and more particularly, to apparatus for measuring parameters of work diagram of piston machines.

The invention may also be used in the investigations, adjustment, control, diagnostics and automation of performance of internal combustion engines, compressors and other piston machines having a crank gear.

BACKGROUND OF THE INVENTION

One of the most decisive factors influencing the reduction of cost in the development of new types of piston machines at present is the reduction of time required for their tests during the research and development period. Not least important is the problem of prolonging the service life of machines. The use of apparatus enabling an operative measurement of performance parameters contributes to the cost reduction in the development of new types of machines and makes it possible to control machine performance to optimize it.

Known in the art is an apparatus for measuring parameters of work diagram of piston machines (cf. U.S. Pat. No. 3,375,711, Apr. 1968), comprising an angular mark sensor having uniformly distributed crankshaft rotation angle marks and a top dead center mark, the output of the sensor being coupled to a crankshaft angular position pulse former and a top dead center pulse former, n sensors sensing pressure in cylinders of piston machines, the output of one sensor, in accordance with the cylinder selected for indication, being coupled to an amplifier converter handling a pressure signal from the cylinder of a piston machine, and a widthpulse converter having a first input connected to the amplifier converter handling the pressure signal from the cylinder of a piston machine, and also comprising a main coincidence gate having a first input coupled to a reference oscillator and a second input coupled to the width-pulse converter, and an analysis and control unit having a flip-flop operatively coupled to the crankshaft angular position pulse former and to the top dead center pulse former, and a counter having its input coupled to the output of the main coincidence gate. In addition, the apparatus comprises a pulse former forming signals of equal increments of a piston machine working volume, a pulse former of forming signals of change in equal increments of piston machine cylinder volume, a lower dead center signal former, having their inputs coupled to respective outputs of the angular mark sensor, and the outputs, to the analysis and control unit, and the angular mark sensor also has uniformly distributed equal cylinder volume increment marks, marks of a change in increments of the cylinder volume and a bottom dead center mark.

It should be, however, noted that in the above-described apparatus the angular mark sensor is provided for measuring parameters of work diagram of only one cylinder of a piston machine. When changing over for measurement of parameters of work diagram of another cylinder, the machine should be stopped, and the sensor should be re-installed thus reducing the productivity in measuring parameters of work diagram during tests and excluding the possibility of using the apparatus for control, diagnostics and automation of performance control in multicylinder machines.

SUMMARY OF THE INVENTION

It is an object of the invention to provide an apparatus for measuring parameters of work diagram of piston machines, which enables an automatic connection of an indicated cylinder in conducting a consecutive measurement of parameters of work diagram of multicylinder piston machines.

Another object of the invention is to provide for measurement of maximum pressure in the cylinder of a piston machine.

Still another object of the invention is to improve the accuracy of measurement of parameters of work diagram.

This is accomplished by that an apparatus for measuring parameters of work diagram of piston machines, comprising an angular mark sensor having uniformly distributed crankshaft rotation angle marks and a dead center mark, the respective outputs of the sensor being coupled to a crankshaft angular position pulse former and a top dead center pulse former, n sensors sensing pressure in cylinders of piston machines, the output of one of the sensors, in accordance with the cylinder selected for indication, being coupled to an amplifier converter handling a pressure signal from the cylinder of a piston machine, and a width-pulse converter having a first input coupled to the amplifier converter handling a pressure signal from the cylinder of a piston machine, and also comprising a main coincidence gate having a first input coupled to a reference oscillator and a second input coupled to the width-pulse converter, and an analysis and control unit having a flip-flop operatively connected to the crankshaft angular position pulse former and the top dead center pulse former, and a counter having an input coupled to the output of the main coincidence gate, according to the invention, is provided with, connected to one another, a current crankshaft rotation angle counter having a first input coupled to the top dead center pulse former and a second input coupled to the crankshaft angular position pulse former, and a top dead center signal decoder having a first output coupled, via a selector switch, in accordance with the cylinder selected for indication, to a first input of the flip-flop of the analysis and control unit, the second input of the flip-flop being coupled to a bottom dead center signal decoder and the output of the flip-flop being coupled to the control input of a reversible counter having its count input coupled to the crankshaft angular position pulse former and an output, to the bottom dead center signal decoder, and a series circuit including a cycle length counter having its input coupled to the output of the bottom dead center signal decoder, a main flip-flop having a second input coupled to the output of the bottom dead center signal decoder and an AND gate having its inputs operatively coupled to the crankshaft angular position pulse former and an output coupled to the width-pulse converter, and the analysis and control unit additionally comprises a logical control circuit having one input coupled to the output of the reversible counter, and the uniformly distributed crankshaft rotation angle marks of the angular mark sensor are used to determine signals of top and bottom dead centers.

In the apparatus according to the invention, a first input of the AND gate is preferably coupled to the main flip-flop and a second input of the AND gate is coupled to the output of the crankshaft angular position pulse former, and in the analysis and control unit, the logical control circuit preferably has a second input coupled to the counter and a third input coupled to the width-pulse converter.

The logical control circuit preferably comprises a series circuit including an analog-digital conversion end pulse former, a coincidence gate and a main register and connected to one another, an auxiliary register having its input coupled to the coincidence gate and a comparison circuit which is coupled to the input of the coincidence gate, and the input is coupled to the other input of the auxiliary flip-flop and is coupled to the output of the counter, the other input of the code comparison circuit is coupled to the auxiliary register.

In case, in the apparatus according to the invention, between the output of the main coincidence gate and the input of the counter comprising a reversible counter coupled to the output of the flip-flop of the analysis and control unit, there is provided an OR gate having a second input coupled to an auxiliary reversible counter having a first input coupled to the output of the flip-flop of the analysis and control unit and a second input coupled to a second auxiliary coincidence gate having a first input coupled to the input of the main coincidence gate connected to the reference oscillator, a second input coupled to the second output of the main coincidence gate associated with the pulse width converter, and a third input coupled to an auxiliary flip-flop having a second output coupled to a third input of the main coincidence gate, according to the invention, the logical circuit preferably has a first input coupled to a first input of an auxiliary AND gate having a second input coupled to the main flip-flop.

The logical control circuit preferably comprises a decoder decoding signals of change in equal increments of cylinder working volume and a decoder decoding signals of equal increments of cylinder working volume, the decoders inputs being connected together to form an input of the logical control circuit.

Between the output of the crankshaft angular position pulse former and the input of the current crankshaft rotation angle counter, there is preferably provided a controlled delay crankshaft angular position pulse oscillator, and between the output of the top dead center pulse former and the second input of the current crankshaft rotation angle counter, there is provided an auxiliary AND gate having a second input coupled to the controlled delay angular position pulse oscillator.

The invention ensures an automatic change over to an indicated cylinder thus reducing time required for testing multicylinder machines. In addition, the automatic changeover of the apparatus enables a consecutive measurement of parameters of work diagram thus providing for performance control, diagnosis of condition and automation of performance control for piston machines.

The invention also enlarges the range of parameters of work diagram.

Other objects and advantages of the invention will become apparent from the following detailed description of specific embodiments thereof illustrated in the accompanying drawings, in which:

FIG. 1 is a structural diagram of an apparatus for measuring parameters of work diagram of piston machines according to the invention;

FIG. 2 is a structural diagram of an apparatus for measuring parameters of work diagram in the mode of measurement of maximum pressure in the cylinder of a piston machine, according to the invention;

DETAILED DESCRIPTION OF THE INVENTION

Figure 3:
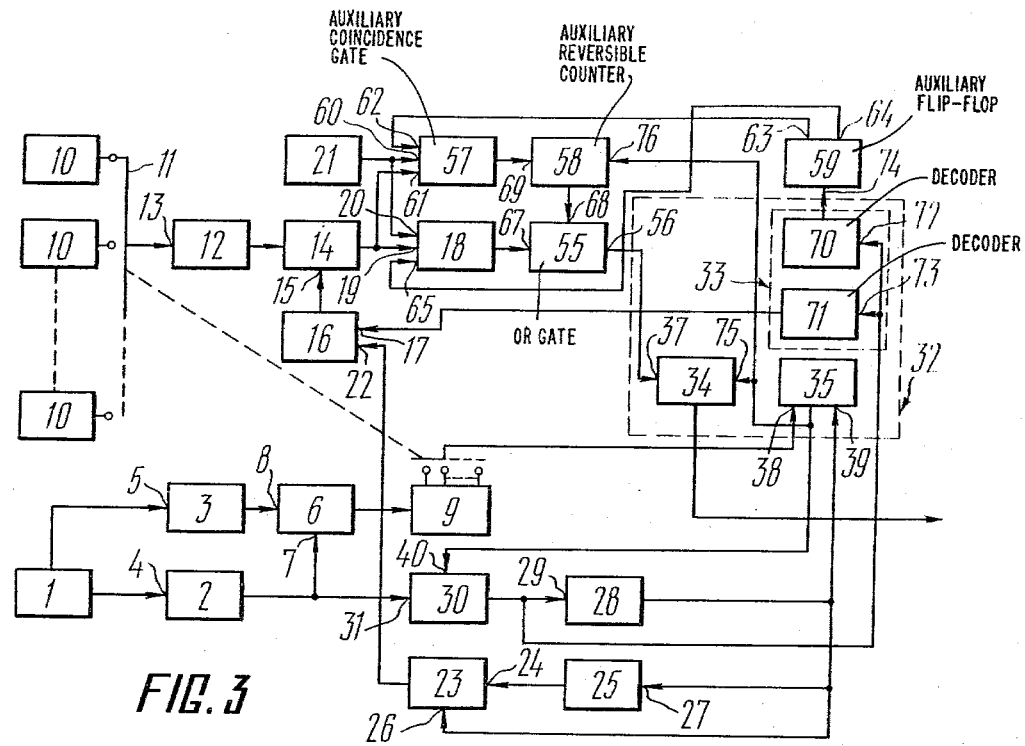
FIG. 3 is a structural diagram of an apparatus for measuring parameters of work diagram in the mode of measurement of average indicator pressure, according to the invention.

As an example, the reference is made to an apparatus for measuring parameters of work diagram of piston machines designed for indication of internal combustion engines.

The apparatus for measuring parameters of work diagram of piston machines comprises an angular mark sensor 1 (FIG. 1) coupled to a crankshaft angular position pulse former 2 and a top dead center pulse former 3 with their inputs 4, 5, respectively. The formers 2 and 3 are coupled to a current crankshaft rotation angle counter 6 with its inputs 7 and 8, and the output of the counter is coupled to a top dead center signal decoder 9.

The apparatus also comprises n sensors 10 sensing pressure in cylinders of piston machines, the output of one of the sensors being connected, via a selector switch 11, to an input 13 of an amplifier converter 12 handling the pressure signal. To the output of the amplifier converter 12 is coupled a pulse width converter 14 having a second input 15 coupled to an AND gate 16 having an input 17 coupled to the pulse former 2 and an output coupled to a main coincidence gate 18 having an input 19. A second input 20 of the coincidence gate 18 is coupled to a reference oscillator 21. To an input 22 of the AND gate 16 is coupled a main flip-flop 23. To a first input 24 of the flip-flop 23 is coupled a cycle length counter 25. To a second input 26 of the flip-flop 23 and to an input 27 of the counter 25 is coupled a bottom dead center signal decoder 28 having its input 29 coupled to a reversible counter 30. A count input 31 of the counter 30 is coupled to the output of the pulse former 2. The apparatus also comprises an analysis and control unit 32 coupled to the pulse width converter 14 and having a logical circuit 33, a counter 34 and a flip-flop 35. To an input 36 of the circuit 33 is coupled the counter 30. To an input 37 of the counter 34 is coupled the circuit 18. To a first input 38 of the flip-flop 35, via the selector switch 11, is coupled one of the outputs of the decoder 9, and to a second input 39, the output of the decoder 28, and the output of the flip-flop 35 is coupled to a control input of the counter 30.

In the apparatus for measuring parameters of work diagram of piston machines in the mode of measurement of maximum pressure in a cylinder of an internal combustion engine, the logical circuit 33 (FIG. 2) comprises an analog-digital conversion end pulse former 41 having its input 42 which is coupled to the converter 14. A normally open switch 42 is inserted in the circuit between the circuit 33 and the counter 30. To the output of the pulse former 41 is coupled a coincidence gate 43 with its input 44, to a second input 45 thereof is coupled a code comparison circuit 46, and to the output thereof is coupled a main register 47 with its input 48 and an auxiliary register 49 with its input 50. One input 51 of the circuit 46 is coupled to the output of the register 49. Other inputs 52, 53 of the circuit 46 and register 49, respectively, are coupled to the counter 34 of the unit 32. A second input 54 of the register 47 is the input 36 (FIG. 1) of the circuit 33.

The apparatus for measuring parameters of work diagram of piston machines in the mode of measurement of average indicator pressure in a cylinder of an internal combustion engine additionally comprises an OR gate (FIG. 3) having its output 56 coupled to the input 37 of the counter 34, an auxiliary coincidence gate 57, an auxiliary reversible counter 58 and an auxiliary flip-flop 59. Inputs 60, 61 of the circuit 57 are coupled to the inputs 20, 19, respectively, of the circuit 18, and an input 62 is coupled to an output 63 of the flip-flop 59. To a second input 64 of the flip-flop 59 is coupled an input 65 of the circuit 18, and an input 66 of the flip-flop 59 is coupled to an output of the decoder 28. A first input 67 of the OR gate 55 is coupled to the output of the circuit 18, a second input 68, to the output of the counter 58 having its input 69 coupled to the circuit 57.

For this mode, the logical circuit 33 comprises a decoder 70 decoding signals of change in equal increments of cylinder working volume and a decoder 71 decoding signals of equal increments of cylinder working volume, having their their respective inputs 72 and 73 connected together and coupled to the counter 30. To the decoder 70 is coupled an input 74 of the flip-flop 59, and to the decoder 71 is coupled the input 55 of the AND gate 16. An input 75 of the counter 34, an input 76 of the counter 58 and the input 40 of the counter 30 are connected together and coupled to the flip-flop 35.

Figure 4:
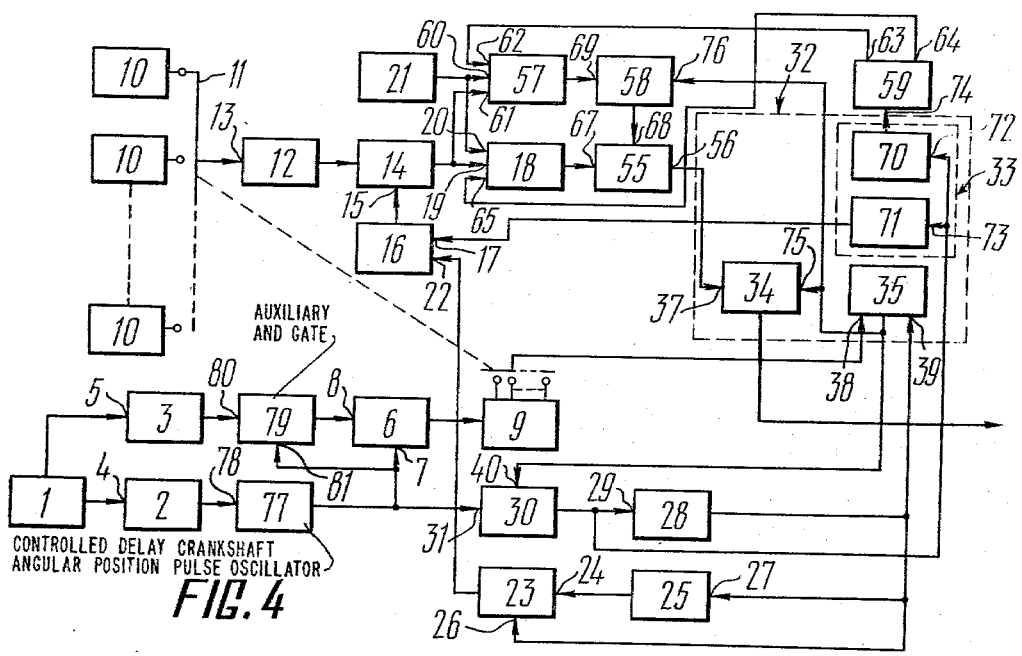
FIG. 4 is a structural diagram of an apparatus for measuring parameters of work diagram in the mode of measurement of average indicator pressure at constant rotary speed of crankshaft, according to the invention.

The apparatus for measuring work diagram of piston machines in the mode of measurement of average indicator pressure in a cylinder of an internal combustion engine at a constant rotary speed of crankshaft additionally comprises a controlled delay crankshaft angular position pulse oscillator 77 (FIG. 4) having its input 78 coupled to the output of the pulse former 2, and an auxiliary AND gate 79 having a first input 80 coupled to the pulse former 3. A second input 81 of the AND gate 79 and the input 7 of the counter 6 are connected together and coupled to the oscillator 77. The output of the AND gate 79 is coupled to the input 8 of the counter 6.

The apparatus for measuring parameters of work diagram of piston machines functions in the following manner.

The angular mark sensor 1 (FIG. 1) generates a signal corresponding to equal changes in rotation angle of the crankshaft, as well as a signal corresponding to the top dead center (referred to below as tdc) in one of the cylinders of a piston machine (not shown). The crankshaft angular position pulse former 2 and the tdc pulse former 3 convert the signals from the sensor 1 into the form suitable for handling in the remaining units of the apparatus.

The current crankshaft rotation angle counter 6 is reset upon every signal coming from the pulse former 3 and counts anew the angular mark pulses from the pulse former 2. The state of the counter 6 at any given moment determines, therefore, a current position of the crankshaft (not shown) relative to the tdc in one of the cylinders. It is noted that a desired accuracy of determination of the angle of rotation of the crankshaft depends on the interval between two adjacent pulses of angular position of the crankshaft, coming from the sensor 1.

When pistons pass the tdc, pulses appear at respective n outputs of the top dead center signal decoder 9.

Depending on the position of the selector switch 11 set by the operator in accordance with the indicated cylinder of a piston machine, the tdc pulse of the selected cylinder sets the flip-flop 35 of the analysis and control unit 32.

The state "1" of the flip-flop 35 determines the "adding" mode for the reversible counter 30.

In this mode, the crankshaft angular position pulses following the tdc pulse are added in the reversible counter 30, and the state of this counter corresponds to the current crankshaft rotation angle relative to the tdc in the indicated cylinder. The state of the counter 30 corresponding to the bottom dead center (referred to below as bdc) in the indicated cylinder is decoded by the bottom dead center signal decoder 28. The signal from the output of the decoder 28 resets the flip-flop 35. The state "0" of the flip-flop 35 determines the "subtraction" mode for the counter 30, and the crankshaft angular position pulses following the bdc pulse are subtracted in the interval between the bdc and tdc. As the angular position pulses are uniformly distributed, their number is the same for the intervals between tdc and bdc and between bdc and tdc. Therefore the pulses accumulated in the counter 30 during the interval between tdc and bdc are subtracted during the interval between bdc and tdc to yield zero. Therefore, at any moment, the state of the flip-flop 35 and reversible counter 30 determines the current position of the crankshaft relative to the tdc of the indicated cylinder. The flip-flop 35 determines the sign relative to the tdc in the indicated cylinder, and the reversible counter 30, the current angle relative to the tdc in the indicated cylinder.

In accordance with the cylinder selected for indication, the signal from the sensor 10 sensing pressure in the cylinder, is fed, via the selector switch 11, to the amplifier converter 12 for handling the pressure signal. It is noted that sensors 10 of any type may be used (such as piezoelectric, inductance and other sensors) having specifications ensuring normal operation in a given application.

The amplifier converter 12 provides at the output the signal from the sensor 10 in the form desired for handling it in the pulse width converter 14. The moment of driving the pulse width converter 14 is determined by the mode of operation of the apparatus. The converter 14 generates at the output a pulse of a length which is proportional to the current pressure in the piston machine cylinder. This pulse is fed to the input 19 of the main coincidence gate 18, the other input 20 of the circuit receiving pulses from the reference oscillator 21. Pulses from the output of the circuit 18 are fed to the unit 32, to the input 37 of the counter 34. During one cycle of conversion of the analog pressure value into a code, pulses received from the output of the gate 18 are accumulated in the counter 34. The states of the counter 34 correspond to the current pressure values.

The measurement begins with resetting of the counters 6, 25, 30, 34 and flip-flops 23, 35. After the apparatus is set in the initial position, a first signal of bdc in the indicated cylinder sets the flip-flop 23 thus authorizing the drive of the pulse width converter 14, via the AND gate 16. The cycle length counter 25 counts a preset number of cycles, resets the flip-flop 23 and holds it in this state thus finishing the measurement.

The logical circuit 33 of the unit 32 processes the information on current pressure in the cylinder, as well as on the current crankshaft rotation angle.

The operation of the apparatus will now be described as applied to the mode of measurement of maximum pressure in a cylinder of an internal combustion engine.

In this mode, the pulse width converter 14 is driven (FIG. 2) by pulses from the pulse former 2, via the AND gate 16. The cycle length counter 25 should be set for one cycle of operation of the engine.

Upon the beginning of every analog-digital conversion, the counter 34 is reset, and, during one drive of the pulse width converter 14, is loaded with a number corresponding to the current pressure in the cylinder for current rotation angle of the crankshaft relative to the tdc in the indicated cylinder. The value of the current angle is stored in the counter 30, and the sign, in the flip-flop 35. The code of the counter 34 is compared, in the code comparison circuit 46, to the code of the auxiliary register 49.

In case the code of the number stored by the end of conversion in the counter 34 is greater than the code of the number stored in the register 49 a signal authorizing the loading of the value of current pressure from the counter 34 to the register 49 and the loading of the value of current rotation angle of crankshaft from the counter 30 to the main register 47 appears at the output of the comparison circuit 46.

The authorizing signal from the output of the comparison circuit 46 is fed to the input 45 of the coincidence gate 43, the second input 44 of the coincidence gate receiving a pulse corresponding to the end of analog-digital conversion from the analog-digital conversion end pulse former 41. The pulse at the output of the coincidence gate 43 loads the current pressure and the current crankshaft rotation angle in the registers 49 and 47, respectively. Upon completion of the measurement cycle maximum pressure in the cylinder during one cycle is fixed in the register 49, and the register 47 stores the value of the crankshaft rotation angle relative to the tdc of the indicated cylinder, which corresponds to the moment at which the pressure in the cylinder achieved its maximum.

The reference is now made to the operation of the apparatus in the mode of measurement of average indicator pressure in a cylinder of an internal combustion engine.

In this mode the apparatus realizes the following algorithm of computation of average indicator pressure:

$$P = \left( \sum_{i=1}^{n\Delta V_1} \frac{p\phi_1}{n} + \sum_{i=1}^{n\Delta V_2} \frac{p\phi_2}{Kn} \right) + \left( \sum_{i=1}^{n\Delta V_1} \frac{p\phi_2}{Kn} + \sum_{i=1}^{n\Delta V_1} \frac{p\phi_2}{n} \right) \quad (1)$$

wherein:

P is the average indicator pressure;

$\phi_1$ is the current value of coordinate during compression:

$\phi_2$ is the current value of coordinate during expansion;

$p\phi_1$ is the current value of pressure at the initial points during compression;

$p\phi_2$ is the current pressure value at the initial point during expansion;

$\Delta V_1$ is the elementary increment of cylinder working volume used for reading the pressure value P;

$\Delta V_2$ is the elementary volume of increment of cylinder working volume near the tdc, used for reading the value of pressure P;

$K = (\Delta V_1 / \Delta V_2)$ is the ratio of elementary volumes $\Delta V_1$ and $\Delta V_2$ of the increment of cylinder working volume (an integer).

The counter 34 is used in the reversible mode. The decoder 71 decoding signals in equal increment of cylinder working volume determines the moments the increments occur in the working volume of the cylinder (the elementary volumes $\Delta V_1$ and $\Delta V_2$), the decoder 70 decoding signals of change of equal increments of the cylinder working volume—moments of transition from the volume increments $\Delta V_1$ to the volume increments $\Delta V_2$. The pulse width converter 14 is driven by a signal from the decoder 71.

The converter 14 converts the current values $p\phi_1$, $p\phi_2$ of pressure in the cylinder into pulses. These pulses ensure the transmission of pulses from the reference oscillator 21 through the AND gate 18 or AND gate 57 depending on the state of the flip-flop 59.

Near the tdc in the indicated cylinder for which the computation is made with the volume increments $\Delta V_2$ in the cylinder smaller than $\Delta V_1$ and equal to $\Delta V_2 = (\Delta V_1 / K)$, the flip-flop 59 is set at the input 74 by a signal from the decoder 70. The pulses from the reference oscillator 21 pass through the gate 57. After a second signal from the decoder 70 is fed, the flip-flop 59 is reset, and pulses from the reference oscillator 21 pass through the gate 18. The signal from the decoder 28 confirms its reset state at the input 66 of the flip-flop 59. With the volume increments $\Delta V_2$ in the cylinder the pulses of the reference oscillator 21 are divided by K in an auxiliary reversible counter 58 and are fed, via the OR gate 55, to the counter 34.

With the volume increments $\Delta V_1$ in the cylinder pulses from the reference oscillator 21 are fed to the counter 34 via the gate 18 or the OR gate 55 without an additional division.

The flip-flop 35 sets the counters 58 and 34 in the interval between the bdc and tdc to the subtraction mode and in the interval between the tdc and bdc, to the adding mode.

Upon completion of measurement a number proportional to the average indicator pressure P is stored in the counter 34.

The AND gate 79 (FIG. 4) and the oscillator 77 improve the accuracy of measurement of average indicator pressure P in the mode of constant crankshaft rotary speed.

This is achieved by enabling the correction of the position of signals corresponding to identical increments in the cylinder. The position of these signals relative to the tdc of the indicated cylinder determines to a large extent the accuracy of measurement of average indicator pressure.

The invention enables an improvement of labor productivity in measuring parameters of multicylinder piston machines during their tests.

In addition, the invention provides for elimination of the need to stop the machine for changing-over to the measurement of parameters of work diagram in another cylinder thus enabling the use of the apparatus for an operative control of multicylindrical machines, diagnosis of their condition and automation of performance control.

What is claimed is:

1. Apparatus for measuring parameters of work diagram of piston machines, said apparatus comprising
an angular mark sensor having uniformly distributed crankshaft rotation angle marks for one of the piston machines, a top dead center mark, a first output and a second output, the crankshaft rotation angle marks being used for determining top dead center signals and bottom dead center signals;
a crankshaft angular position pulse former having an input electrically connected to the first output of said angular mark sensor and an output;
a top dead center pulse former having an input electrically connected to the second output of said angular mark sensor and an output;
a current crankshaft rotation angle counter having a first input electrically connected to the output of said crankshaft angular position former, a second input electrically connected to the output of said top dead center pulse former and an output;
a reversible counter having a first input electrically connected to the output of said crankshaft angular position pulse former, a second input and an output;
a bottom dead center signal decoder for decoding bottom dead center signals, said bottom dead center signal decoder having an input electrically connected to the output of said reversible counter and an output;
a cycle length counter having an input electrically connected to the output of said bottom dead center signal decoder and an output;
a main flip-flop having a first input electrically connected to the output of said cycle length counter, a second input electrically connected to the output of said bottom dead center signal decoder and an output;
a top dead center signal decoder for decoding top dead center signals, said top dead center signal decoder having an input electrically connected to the output of said current crankshaft rotation angle counter and n outputs;
a selector switch having a first group of inputs among n inputs, a second group of inputs among n inputs, a first output and a second output, one of the inputs of the first group of inputs being coupled to a corresponding one of the n outputs of said top dead center signal decoder;
n pressure sensors in cylinders of piston machines, each having an output coupled to a corresponding one of the n inputs of the second group of inputs of said selector switch;
an amplifier converter for handling a pressure signal of the cylinder of a piston machine, said amplifier converter having an input electrically connected to the second output of said selector switch and an output;
a pulse width converter having a first input electrically connected to the output of said amplifier converter, a second input and an output;
an AND gate having a first input electrically connected to the output of said crankshaft angular position pulse former, a second input, and an output electrically connected to the second input of said pulse width converter;
a main coincidence gate having a first input electrically connected to the output of said pulse width converter, a second input and an output;
a reference oscillator having an output electrically connected to the second input of said main coincidence gate; and
an analysis and control unit having a first input electrically connected to the output of said main coincidence gate, a second input electrically connected to the first output of said selector switch, a third input electrically connected to the output of said reversible counter, a fourth input electrically connected to the output of said bottom dead center signal decoder, and an output electrically connected to the second input of said reversible counter, said analysis and control unit including a logical circuit having a first input which is the third input of said analysis and control unit, a counter having an input which is the first input of said analysis and control unit and a flip-flop having a first input which is the second input of said analysis and control unit, a second input which is the fourth input of said analysis and control unit, and an output which is the output of said analysis and control unit.

2. Apparatus as claimed in claim 1, wherein the second input of said AND gate is electrically connected to the output of said main flip-flop and said logical circuit having a second input electrically connected to the output of said pulse width converter and a third input electrically connected to the output of said reversible counter.

3. Apparatus as claimed in claim 2, wherein said logical circuit comprises an analog-digital conversion end pulse former having an input which is the third input of said logical circuit and an output, a coincidence gate having a first input electrically connected to the output of said analog-digital conversion end pulse former, a second input and an output, a main register having a first input and a second input which is the second input of said logical circuit, a code comparison circuit having a first input, a second input and an output electrically connected to the second input of said coincidence gate, and an auxiliary register having a first input electrically connected to the second input of said code comparison circuit, a second input electrically connected to the output of said coincidence gate and an output, the first input of said code comparison circuit and the first input of said auxiliary register being connected together and forming a third input of said logical circuit.

4. Apparatus as claimed in claim 3, further comprising a controlled delay crankshaft angular position pulse oscillator electrically connecting said current crankshaft rotation angle counter to said crankshaft angular position pulse former, said controlled delay crankshaft angular position pulse oscillator having an input electrically connected to the output of said crankshaft angular position pulse former and an output electrically connected to the input of said current crankshaft rotation angle counter, and an auxiliary AND gate electrically connecting said current crankshaft rotation angle counter to said top dead center pulse former, said auxiliary AND gate having a first input electrically connected to the output of said top dead center pulse former, a second input electrically connected to the output of said controlled delay crankshaft angular position pulse oscillator and an output electrically connected to the second input of said current crankshaft rotation angle counter.

5. Apparatus as claimed in claim 1, wherein said logical circuit comprises an analog-digital conversion end pulse former having an input which is a second input of said logical circuit and an output, a coincidence gate having a first input electrically connected to the output of said analog-digital conversion end pulse former, a second input and an output, a main register having a first input and a second input which is the first input of said logical circuit, a code comparison circuit having first and second inputs and an output electrically connected to the second input of said coincidence gate, and an auxiliary register having a first input, a second input electrically connected to the output of said coincidence gate and an output electrically connected to the second input of said code comparison circuit, the first input of said code comparison circuit and the first input of said auxiliary register being connected together and forming a third input of said logical circuit.

6. Apparatus as claimed in claim 1, further comprising an OR gate electrically connected between said main coincidence gate and said analysis and control unit, said OR gate having a first input electrically connected to the output of said main coincidence gate, a second input and an output electrically connected to the first input of said analysis and control unit, an auxiliary reversible counter having a first input electrically connected to the output of said analysis and control unit, a second input and an output electrically connected to the second input of said OR gate, an auxiliary coincidence gate electrically coupling said pulse width converter to said analysis and control unit, said auxiliary coincidence gate having a first input electrically connected to the output of said reference oscillator, a second input electrically connected to the output of said pulse width converter, a third input, and an output electrically connected to the second input of said auxiliary reversible counter, an auxiliary flip-flop electrically coupling said pulse width converter to said analysis and control unit, said auxiliary flip-flop having a first input electrically connected to the third input of said auxiliary coincidence gate, a first output and a second output, said main coincidence gate having a third input electrically connected to the second output of said auxiliary flip-flop, said analysis and control unit having a second output electrically connected to the input of said auxiliary flip-flop, and a third output, the first input of said AND gate being electrically connected to the third output of said analysis and control unit, the second input of said AND gate being electrically connected to the output of said main flip-flop, said logical circuit having first and second outputs which are the second and third outputs, respectively, of said analysis and control unit, and the counter of said logical circuit having a second input electrically connected to the output of the flip-flop of said logical circuit.

7. Apparatus as claimed in claim 6, wherein said logical circuit comprises a first decoder for decoding signals of changes in equal increments of cylinder working volume, said first decoder having an input and an output which is the first output of said logical control circuit, and a second decoder decoding signals of equal increments of cylinder working volume, said second decoder having an input and an output which is the second output of said logical control circuit, the outputs of said first and second decoders being connected together and forming the input of said logical circuit.

8. Apparatus as claimed in claim 7, further comprising a controlled delay crankshaft angular position pulse oscillator electrically connecting said current crankshaft rotation angle counter to said crankshaft angular position pulse former, said controlled delay crankshaft angular position pulse oscillator having an input electrically connected to the output of said crankshaft angular position pulse former and an output electrically connected to the input of said current crankshaft rotation angle counter, and an auxiliary AND gate electrically connecting said current crankshaft rotation angle counter to said top dead center pulse former, said auxiliary AND gate having a first input electrically connected to the output of said top dead center pulse former, a second input electrically connected to the output of said controlled delay crankshaft angular position pulse oscillator and an output electrically connected to the second input of said current crankshaft rotation angle counter.

* * * * *